United States Patent
Morf et al.

(10) Patent No.: US 10,637,234 B2
(45) Date of Patent: Apr. 28, 2020

(54) ESD PROTECTION CIRCUIT

(71) Applicant: International Business Machines Corporation, Armonk, NY (US)

(72) Inventors: Thomas E. Morf, Gross (CH); Thomas H. Toifl, Zurich (CH); Jonas R. Weiss, Hirzel (CH)

(73) Assignee: International Business Machines Corporation, Armonk, NY (US)

(*) Notice: Subject to any disclaimer, the term of this patent is extended or adjusted under 35 U.S.C. 154(b) by 516 days.

(21) Appl. No.: 15/189,408

(22) Filed: Jun. 22, 2016

(65) Prior Publication Data
US 2017/0373493 A1    Dec. 28, 2017

(51) Int. Cl.
*H02H 9/00* (2006.01)
*H02H 9/04* (2006.01)

(52) U.S. Cl.
CPC .................. *H02H 9/046* (2013.01)

(58) Field of Classification Search
CPC ........................................ H02H 9/046
USPC .................................... 361/56, 111
See application file for complete search history.

(56) References Cited

U.S. PATENT DOCUMENTS

| | | | | |
|---|---|---|---|---|
| 5,267,071 A | * | 11/1993 | Little ............... | H03G 3/3084 250/214 A |
| 5,390,337 A | * | 2/1995 | Jelinek ............ | H03H 7/461 333/132 |
| 7,634,243 B1 | * | 12/2009 | Esquivel .......... | H03J 3/08 455/161.1 |
| 8,504,952 B2 | | 8/2013 | Yehezkely | |
| 8,842,399 B2 | | 9/2014 | Jones et al. | |
| 9,093,977 B2 | | 7/2015 | Jin et al. | |
| 2008/0112101 A1 | | 5/2008 | McElwee et al. | |
| 2010/0290508 A1 | * | 11/2010 | Gilliland ........... | G06F 11/0757 375/220 |
| 2014/0049862 A1 | | 2/2014 | Ma et al. | |

(Continued)

FOREIGN PATENT DOCUMENTS

CN    104867437 A    8/2015

OTHER PUBLICATIONS

Lin et al., "ESD Protection Design for Radio-Frequency Integrated Circuits in Nanoscale CMOS Technology", Proceedings of the 13th IEEE International Conference on Nanotechnology, Beijing, China, Aug. 5-8, 2013, pp. 241-244.

(Continued)

*Primary Examiner* — Thienvu V Tran
*Assistant Examiner* — Lucy M Thomas
(74) *Attorney, Agent, or Firm* — Scully, Scott, Murphy & Presser, P.C.; Daniel Morris, Esq.

(57) ABSTRACT

An electrostatic discharge (ESD) protection circuit for providing ESD protection to an ESD protected circuit. The protection circuit comprises a signal pad and a crossover network for separating wanted electrical data signals and ESD signals according to their frequency. The protection circuit further comprises a first branch configured to transmit at least a spectral part of the wanted electrical data signals between the signal pad and the ESD protected circuit and a second branch configured to receive the ESD signals from the signal pad. Additionally there is provided a corresponding method, a corresponding integrated circuit chip and a corresponding design structure.

19 Claims, 6 Drawing Sheets

(56) References Cited

U.S. PATENT DOCUMENTS

| | | | |
|---|---|---|---|
| 2014/0146425 A1* | 5/2014 | Kim | H02H 9/044 |
| | | | 361/56 |
| 2014/0168834 A1* | 6/2014 | Kanemaru | H01L 27/0288 |
| | | | 361/56 |
| 2014/0184253 A1 | 7/2014 | Nelsen et al. | |
| 2017/0077697 A1* | 3/2017 | Girard | H04B 3/00 |

OTHER PUBLICATIONS

Liang, "Design considerations for system-level ESD circuit protection", Analog Applications Journal 4Q 2012, pp. 28-31.

* cited by examiner

ESD PROTECTION CIRCUIT

FIELD

The present disclosure relates to an electrostatic discharge (ESD) protection circuit for providing ESD protection to an ESD protected circuit.

The present disclosure further relates to an integrated circuit chip comprising an ESD protection circuit, a method for providing electrostatic discharge protection to an ESD protected circuit and a design structure for designing, manufacturing, or testing an integrated circuit.

BACKGROUND

The input and output speed of integrated circuits (ICs) constantly increases with each respective new generation of chips. Input/output (I/O) pins of large ICs can exceed 4 Tb of data per second of aggregated data transfer. ICs tend to build up electrostatic charges. Consequently, ICs are routinely configured with electrostatic discharge (ESD) protection circuits to mitigate chip damage caused by electrostatic charge buildup. However, at higher data transfer rates, capacitance of ESD protection elements may exceed allowable limits. Unfortunately, ESD devices have not scaled to keep up with increases in IC speed. In some conventional approaches, T-coils have been used to cancel out a portion of the capacitance. However, this may not be sufficient for ultra-wide band ICs. Furthermore, distributed ESD-protection schemes are known. However, such schemes need significant chip area.

U.S. Pat. No. 8,504,952 B2 discloses a miniaturized ESD protection circuit designed for millimeter wave electrical elements. The ESD protection circuit comprises a metal line being connected at one end to a ground and at other end to a connective strip, wherein a length of the metal line is a maximum length that achieves a resistance value defined for the ESD protection circuit and a width of the metal line is set to a maximum width allowed for the multilayer substrate, wherein the metal line introduces a inductance value into the ESD protection circuit. A capacitor is connected in parallel to the metal line and has a capacitance value resonating the metal line at an operating frequency band. Thereby the ESD protection circuit shunts ESD pulses to the ground and passes signals at the operating frequency band.

US 2008/0112101 discloses an integrated circuit chip with on-chip millimeter wave (mmW) circuitry. An on-chip electro static discharge protection network couples a signal pad of the chip to the mmW circuitry. The ESD protection network has a shorted stub being a low impedance path to ground for ESD events.

It is therefore desirable to provide improved ESD protection circuits and associated methods and design structures.

BRIEF SUMMARY

According to a first aspect, there is provided an electrostatic discharge (ESD) protection circuit for providing ESD protection to an ESD protected circuit. The protection circuit comprises a signal pad and a crossover network for separating wanted electrical data signals and ESD signals according to their frequency into at least a first branch and a second branch. The first branch is configured to transmit at least a spectral part of the wanted electrical data signals between the signal pad and the ESD protected circuit and the second branch is configured to receive the ESD signals from the signal pad.

One idea of the first aspect is to separate the ESD signals from wanted electrical data signals based on the frequency of the wanted signals and the ESD signals. Wanted electrical data signals may be defined as signals that are desired and that shall be processed by the ESD protected circuit. Such a separation allows separate processing of the wanted electrical data signals and the ESD signals. Furthermore, challenges associated with the respective frequency of the ESD signals and the wanted electrical data signals may be treated separately. It should be noted that not all frequency components of wanted signals need to be separated from the ESD signal. Rather according to embodiments only a spectral part or a spectral subset of a wanted data signal may be separated from the ESD signal. According to embodiments, in particular a high frequency spectral part of a wanted electrical signal may be separated from the ESD signal. In other words, according to embodiments the wanted data signals may be fully separated or they may only be partly separated from the ESD signal.

According to a further embodiment, the first branch comprises a high pass filter. The high pass filter is configured to transmit only frequency components above a predefined spectrum of the ESD signals. Furthermore, the second branch comprises a low pass filter. The low pass filter is configured to transmit frequency components within the predefined spectrum of the ESD signals.

This is a reliable and efficient way for implementing the crossover network. According to this embodiment the first branch provides a high frequency path that is configured to transmit frequency components above the predefined spectrum of the ESD signals. In the passband such a high frequency path provides a lower transmission at low frequencies and a higher transmission at high frequencies. This may be considered opposite to classical ESD protection concepts. Furthermore, the high loss at low frequencies and the low loss at high frequencies may be used to compensate for channel losses.

The cut off frequencies of the high pass filter and the low pass filter may be designed according to the needs of the respective application, in particular the frequency range of the wanted electrical data signals and the spectrum of the ESD signals. The high pass filter shall pass the wanted data signals or at least a high frequency portion of the wanted data signals and attenuate the ESD signals. On the contrary, the low pass filter shall pass the ESD signals and attenuate the wanted data signals or at least a high frequency portion of the wanted data signals.

According to a further embodiment, the ESD protection circuit is configured such that the energy of the ESD signals is absorbed in the second branch. Accordingly it can be ensured that the ESD signals do not harm the ESD protected circuit.

According to a further embodiment, the crossover network is implemented as frequency diplexer.

This is an efficient way to implement the crossover network with two different frequency paths.

According to a further embodiment, the predefined spectrum of the ESD signals comprise the frequency range of standardized ESD-events.

This allows to direct ESD signals of the most important ESD scenarios to the second branch. Examples of standardized ESD-events encompass the human body model (HBM), the machine model (MM) and the charge device model (CDM).

According to a further embodiment the predefined spectrum of the ESD signals comprise the frequency range of the ESD charge device model (CDM).

The frequency range of the CDM model comprises the highest frequency components of the standardized ESD events. Hence this embodiment can ensure a good coverage of the most important ESD events.

According to a further embodiment the crossover circuit is configured to transmit frequency components below approximately 2 GHz to the second branch and frequency components above approximately 4 GHz to the first branch.

This allows a good and reliable separation of the signals.

According to a further embodiment the second branch comprises one or more ESD-protection elements. The one or more ESD protection elements are preferably implemented as diodes.

According to such embodiments the ESD diode capacitance size is no more critical. Rather a higher ESD capacitance may even be advantageous as it allows an easier implementation of the inductance of the low pass filter on a chip.

According to a further embodiment the first branch is configured to transmit a high frequency part of the spectrum of the wanted signals to the ESD protected circuit and the second branch is configured to transmit and to recover a low frequency part of the spectrum of the wanted signals to the ESD protected circuit.

According to this embodiment the second branch can also be used for low frequency components of the wanted electrical data signals. Accordingly the second branch serves two purposes. On the one hand it is configured to receive and eliminate the ESD signal. On the other hand it is configured to transmit and to recover the low frequency spectrum of the wanted data signals between the signal pad and the ESD protected circuit. The capacitance of the ESD protection elements does not adversely affect the low frequency components due to their low frequency. Accordingly the part of the wanted signal that falls in the same spectral range as the ESD signal can be recovered. According to a preferred embodiment the second branch may be configured to recover the DC level of the wanted signals.

According to a further embodiment the first branch and the second branch comprise a line impedance termination.

This reduces and minimizes respectively reflections in the whole spectrum covered by the first branch and the second branch.

According to a further embodiment the high pass filter is configured as second order high pass filter and the low pass filter is configured as second order low pass filter.

Such an embodiment provides a simple and efficient design that may be implemented on a small area.

According to a further embodiment the high pass filter is configured as third order high pass filter and the low pass filter is configured as second order low pass filter.

Such an embodiment may provide a lower voltage over the capacitor of the high pass filter. Furthermore, it may reduce resonances at the signal input pad.

According to a further embodiment the low pass filter is implemented as second order LC-filter comprising an inductor and a capacitor. Preferably the inductor is arranged closer to the signal pad than the capacitor. This "hides" the capacitor from the high frequency components of the wanted signal that shall be transmitted in the first branch.

According to a further embodiment the high pass filter is implemented as second order LC-filter comprising an inductor and a capacitor. Preferably the capacitor is arranged closer to the signal pad than the inductor. This in order to direct the ESD current into the low pass filter.

According to a further embodiment the high pass filter is implemented as filter comprising an inductor and a parallel arrangement of two diodes. The diodes are arranged with opposite polarity and are configured to provide a substantially equal capacitance.

According to this embodiment in an ESD event the diodes are conducting. The inductor is also conducting and limits the current in the high pass filter. Accordingly the voltage on the signal pad and the current in the low pass filter may be reduced.

According to a further embodiment the high pass filter is implemented as transformer and the transformer is capacitively coupled to the signal pad. This may provide a higher signal voltage and some peaking.

According to a further embodiment an optical receiver comprising an ESD protection circuit according to the first aspect and a photo-diode is provided. The photo-diode is coupled to the signal pad and the second branch is configured to provide a bias voltage for the photo diode. Furthermore, the second branch is configured to deliver the DC level of the wanted signals to the receiver.

This provides an elegant ESD protection for optical receivers.

According to a further embodiment an optical transmitter is provided comprising an ESD protection circuit according to the first aspect and a laser device. The laser device is coupled to the signal pad and the second branch is configured to provide a bias voltage for the laser device.

This provides an elegant ESD protection for optical transmitters.

According to a further embodiment the laser device is a vertical cavity surface emitting laser.

According to a second aspect an integrated circuit chip is provided. The integrated circuit chip comprises an electrostatic discharge (ESD) protection circuit for providing ESD protection to on-chip circuitry of the chip. The integrated circuit chip comprises a signal pad, a crossover network for separating wanted electrical data signals and ESD signals according to their frequency into at least a first branch and a second branch. The first branch is configured to transmit at least a spectral part of the wanted electrical data signals between the signal pad and the on-chip-circuitry and the second branch is configured to receive the ESD signals from the signal pad.

According to a further embodiment a system is provided comprising an integrated circuit chip according to the second aspect and coding circuitry. The coding circuitry is configured to provide coding for a wanted signal to be processed by the integrated circuit chip such that the frequency spectrum of the wanted signal is above the frequency spectrum of the ESD signals.

According to another aspect, there is provided a method for providing electrostatic discharge (ESD) protection to an ESD protected circuit. The method comprises providing an ESD protection circuit. The protection circuit comprises a signal pad, a crossover network and at least a first branch and a second branch. The method further comprises a step of separating, by the crossover network, wanted electrical data signals and ESD signals according to their frequency into the first branch and the second branch. The method comprises further steps of transmitting, by the first branch, at least a spectral part of the wanted electrical data signals between the signal pad and the ESD protected circuit and receiving, by the second branch, the ESD signals from the signal pad.

According to another aspect, there is provided a design structure tangibly embodied in a machine readable medium for designing, manufacturing, or testing an integrated circuit. The design structure comprises an electrostatic discharge (ESD) protection circuit for providing ESD protection to an ESD protected circuit according to the first aspect.

Advantages of the features of one aspect described may apply to corresponding features of another aspect described herein.

Devices and methods will now be described, by way of non-limiting examples, and in reference to the accompanying drawings. Technical features depicted in the drawings are not necessarily to scale. Also some parts may be depicted as being not in contact to ease the understanding of the drawings, whereas they may very well be meant to be in contact, in operation.

DETAILED DESCRIPTION

Figure 1:
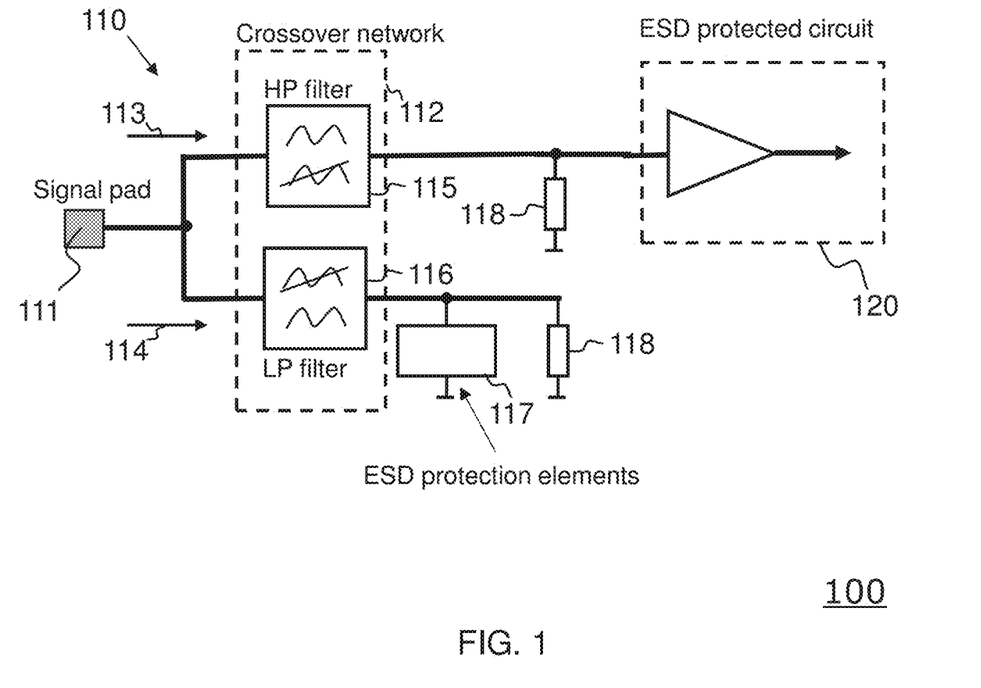
FIG. 1 is a block diagram of an electronic system comprising an electrostatic discharge (ESD) protection circuit according to an embodiment.

FIG. 1 is a block diagram of an electronic system 100 comprising an electrostatic discharge (ESD) protection circuit 110 according to an embodiment. The ESD protection circuit 110 is configured to provide ESD protection to an ESD protected circuit 120. The ESD protection circuit 110 comprises a signal pad 111. The signal pad 111 may be e.g. a bond pad of an integrated circuit chip. The signal pad 111 is configured to receive wanted signals from external devices, circuits or systems that shall be processed by the ESD protected circuit 120. In addition to the wanted signals the signal pad may also receive unwanted ESD signals due to various ESD events. The ESD protection circuit 110 is configured to protect the ESD protected circuit 120 from such ESD events so that the ESD protected circuit 120 is not harmed by any ESD signals of the respective ESD event. The ESD protection circuit 110 comprises a crossover network 112 that is configured to separate the wanted electrical data signals received or transmitted at the signal pad 111 from the unwanted ESD signals received at the signal pad 111. The crossover network 112 is configured to perform the separation based on the frequency of the respective signals. More particularly, the crossover network 112 is embodied as a diplexer that separates the wanted electrical data signals and the ESD signals into a first a first branch 113 and a second branch 114. The first branch 113 is configured to transmit the wanted electrical data signals between the signal pad 111 and the ESD protected circuit 120, while the second branch 114 is configured to receive the ESD signals from the signal pad 111.

The first branch 113 comprises a high pass filter 115. The high pass filter 115 is configured to pass only frequency components above a predefined spectrum of the ESD signals. Accordingly the ESD signals that are not within the predefined spectrum are not transmitted in the first branch 113 and hence do not reach the ESD protected circuit 120. The frequency components above the predefined spectrum of the ESD signals comprise the wanted signals that are desired and shall be processed by the ESD protected circuit 120. These wanted signals can pass the high pass filter 115 and are transmitted via the high pass filter 115 from the signal pad 111 to the ESD protected circuit 120

The second branch 114 comprises a low pass filter 116. The low pass filter 116 is configured to pass only frequency components within the predefined spectrum of the ESD signals. Accordingly the ESD signals that are within the predefined spectrum are received by the second branch 114.

The second branch 114 is configured to take care of the received ESD signals such that the energy of the ESD signals is absorbed in the second branch 114. Accordingly the ESD signals do not reach the ESD protected circuit 120. The high frequency components above the predefined spectrum of the ESD signals do not pass the low pass filter 116 and do hence not influence the performance/functioning of the second branch 114. The second branch 114 comprises one or more ESD-protection elements 117. The ESD protection elements 117 may be e.g. implemented as diodes as generally known in the art.

In case of an ESD event the second branch 114 receives the corresponding ESD signals and absorbs the ESD signals by means of the ESD protection elements 117.

The first branch 113 as well as the second branch 114 comprise termination resistors 118 as line impedance termination. These termination resistors 118 are chosen to match the line impedance of the first branch 113 and of the second branch 114. A typical resistance value for the line impedance and hence for the termination resistors is 50 Ohm.

According to the embodiment of FIG. 1 the second branch 114 is not connected with the ESD protected circuit 120 and the whole spectrum of the wanted signal is transmitted via the first branch 113 from the signal pad 111 to the ESD protected circuit 120.

Figure 2:
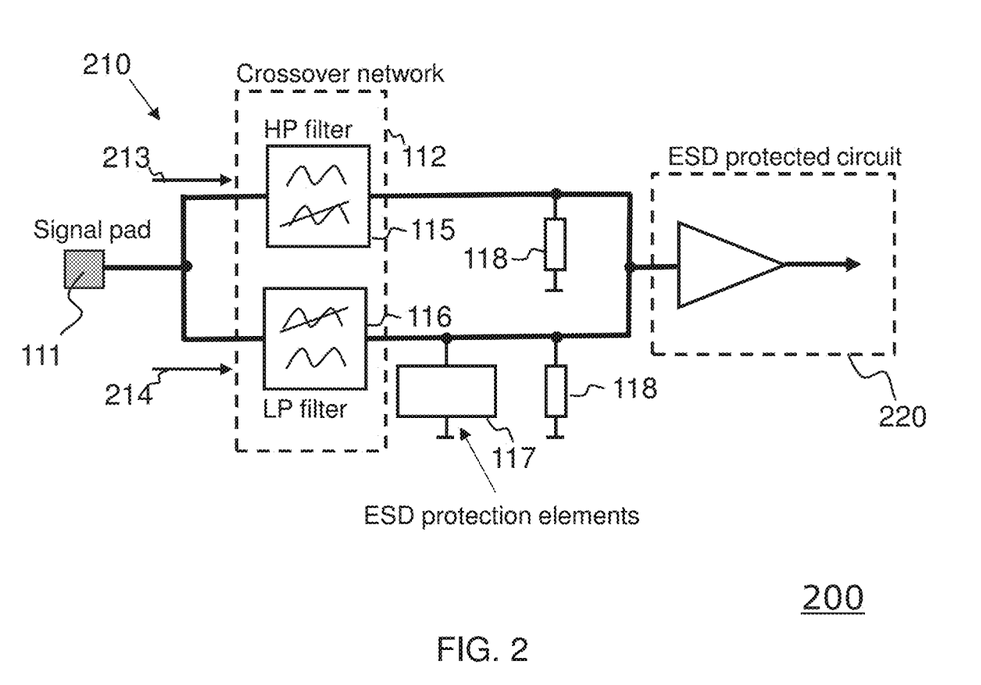
FIG. 2 is a block diagram of another electronic system comprising an electrostatic discharge (ESD) protection circuit according to an embodiment.

FIG. 2 shows a block diagram of an electronic system 200 comprising an electrostatic discharge (ESD) protection circuit 210 according to another embodiment. The protection circuit 210 comprises a first branch 213 and a second branch 214 which are both connected to an ESD protected circuit 220. Accordingly the first branch 213 is configured to transmit/convey a high frequency part of the spectrum of the wanted signal to the ESD protected circuit 220, while the second branch 214 is configured to transmit a low frequency part of the spectrum of the wanted signal to the ESD protected circuit 220. In addition, the second branch 214 may be configured to recover the DC level of the wanted signal.

This may be useful in case the wanted data signals comprise low frequency components within the predefined spectrum of the ESD events. According to such an embodiment the transmission of the wanted data signal can be shared between the first branch 213 and the second branch 214. In addition to handling ESD events and the associated ESD signals, the second branch 214 can be used for low frequency components of the wanted electrical data signal. The capacitance of the ESD protection elements 117 does not adversely influence the low frequency components of the wanted signal due to their low frequency.

Figure 3:
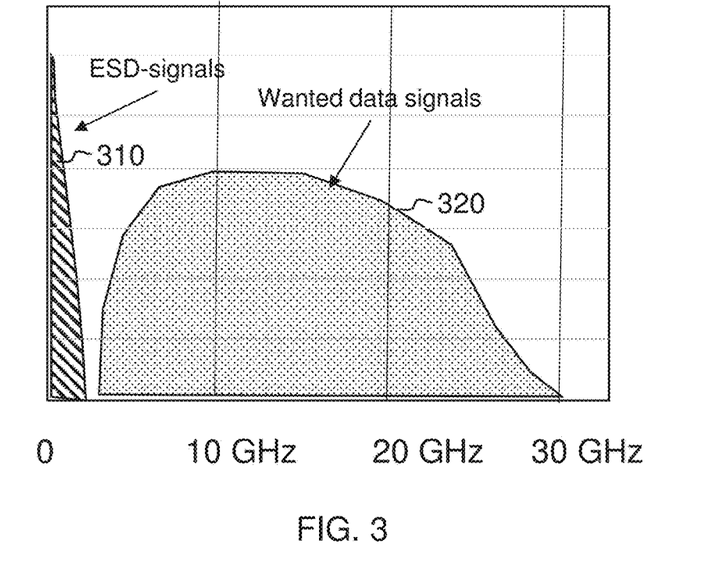
FIG. 3 shows a spectrum of ESD signals and a spectrum of wanted data signals.

FIG. 3 shows a spectrum 310 of ESD signals and a spectrum 320 of wanted data signals that shall be processed e.g. by the ESD protected circuit 120. As illustrated the ESD signals comprise essentially only frequency components below 2 GHz, while the wanted data signals comprise essentially only components above 2 GHz. In order to separate the ESD signals from the wanted data signals the crossover network 112 can be designed such that the high pass filter 115 passes the spectrum 320 while it attenuates or blocks the spectrum 310. On the contrary, the low pass filter 116 passes the spectrum 310 while it attenuates or blocks the spectrum 320. The spectrum 310 of the ESD signals establishes a predefined spectrum of the ESD signals that is considered for the configuration or design of the high pass filter 115 and the low pass filter 116.

The spectrum 310 is an example of a frequency range of standardized ESD-events. Such standardized ESD events represent typical examples of ESD events that may occur during device operation. Examples of standardized ESD-events encompass the human body model (HBM) which has a rather low frequency range below 20 MHz. Another example is the machine model (MM) with a frequency range below 100 MHz. Yet another example is the charge device model (CDM) with a frequency range below 1 GHz. Preferably the design of the crossover network is adapted to the CDM model as this comprises the frequency range with the highest frequency.

According to a preferred embodiment the crossover network 112 is configured to pass frequency components below approximately 2 GHz to the second branch 114 and frequency components above approximately 2 GHz to the first branch 113. According to another preferred embodiment the crossover network 112 is configured to pass frequency components below approximately 2 GHz to the second branch 114 and frequency components above approximately 4 GHz to the first branch 113. However, generally the bandwidth of the high pass filter 115 and the low pass filter 116 may be designed according to the needs of the respective application, in particular the spectrum of the respective ESD signals and the spectrum of the respective wanted signals.

Figure 4:
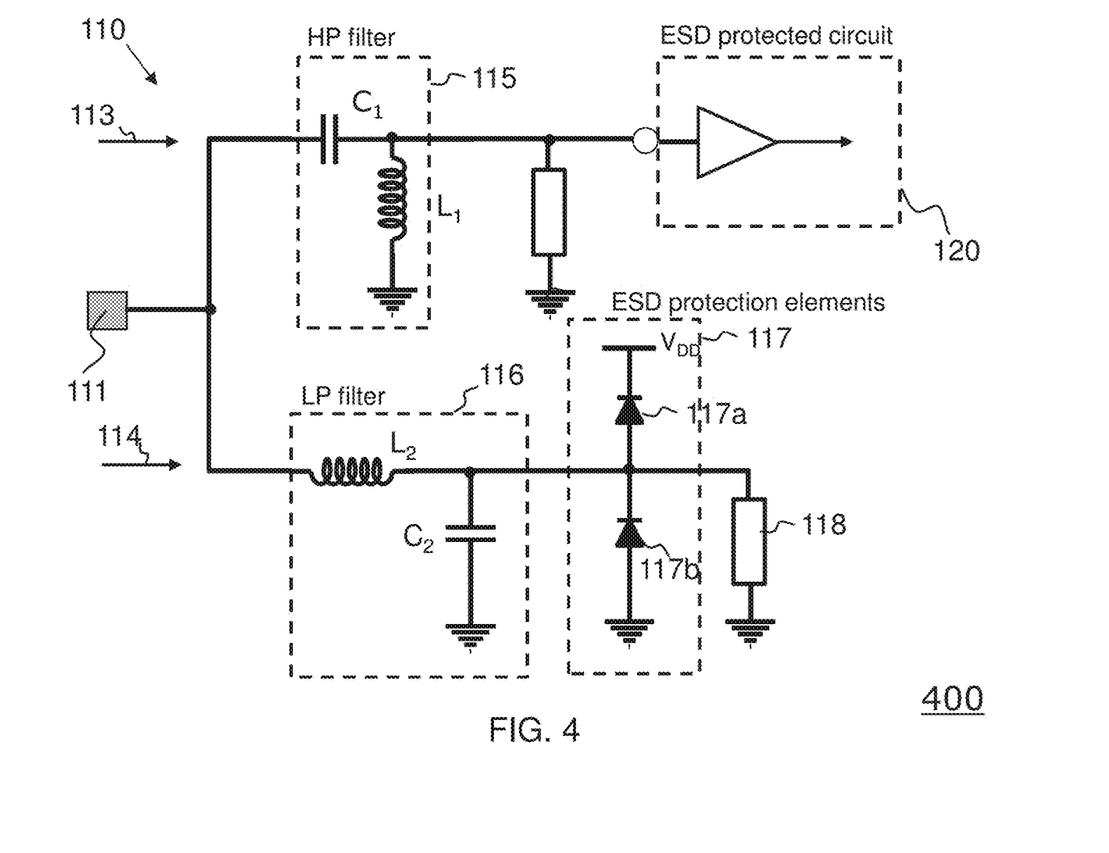
FIG. 4 is a block diagram of an electronic system comprising an ESD protection circuit with a second order high pass filter and a second order low pass filter.

FIG. 4 is a block diagram of an electronic system 400 comprising a more detailed embodiment of the system 100 of FIG. 1. The high pass filter 115 is implemented as second order high pass filter and the low pass filter 116 is implemented as second order low pass filter. Accordingly the high pass filter 115 comprises a capacitor $C_1$ and an inductor $L_1$. Furthermore, the low pass filter 116 comprises a capacitor $C_2$ and an inductor $L_2$. In the low pass filter 116 the inductor $L_2$ is arranged closer to the signal pad 111 than the capacitor $C_2$. This "hides" or isolates respectively the capacitor $C_2$ from the high frequency components of the wanted data signal.

In the high pass filter 115 the capacitor $C_1$ is arranged closer to the signal pad 111 than the inductor $L_1$. This limits the ESD current trough the inductor L1 which allows narrower metal widths in L1.

The ESD protection elements 117 are implemented as ESD diodes 117a and 117b. The ESD diode 117a is connected to a positive supply voltage VDD, while the ESD diode 117b is connected to ground. The ESD diodes 117a and 117b may operate in a conventional way, i.e. positive ESD pulses are taken away via the diode 117a and negative ESD pulses are taken away via the diode 117b.

It should be noted that the capacitor $C_2$ of the low pass filter 116 may be not be a separate discrete capacitor, but may be rather embodied as a parasitic capacitance of the ESD diodes 117a and 117b.

Figure 5:
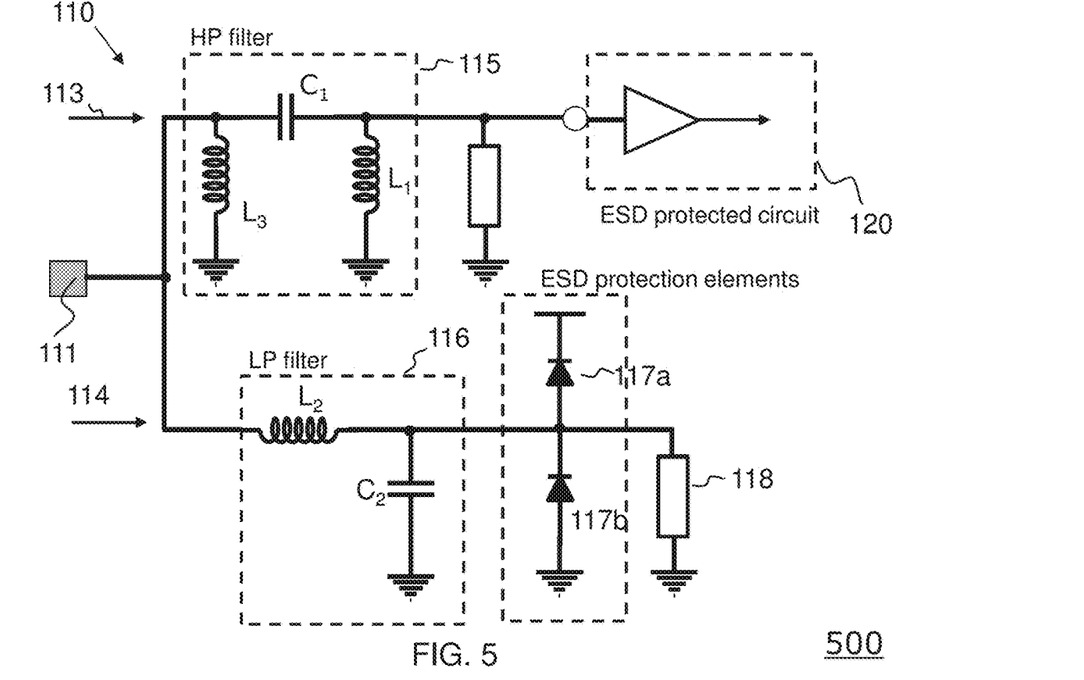
FIG. 5 is a block diagram of an electronic system comprising an ESD protection circuit with a third order high pass filter and a second order low pass filter.

FIG. 5 is a block diagram of an electronic system 500 comprising another more detailed embodiment of the system 100 of FIG. 1. The high pass filter 115 is implemented as third order high pass filter and the low pass filter 116 is implemented as second order low pass filter. Accordingly the high pass filter 115 comprises a capacitor $C_1$, an inductor $L_1$ and another inductor $L_3$. The inductor $L_3$ is arranged closer to the signal pad 111 than the capacitor $C_1$, while the inductor $L_1$ is arranged farer to the signal pad 111 than the capacitor $C_1$.

This provides a lower voltage over the capacitor $C_1$ and avoids resonances at the input of the high pass filter 115.

Figure 6:
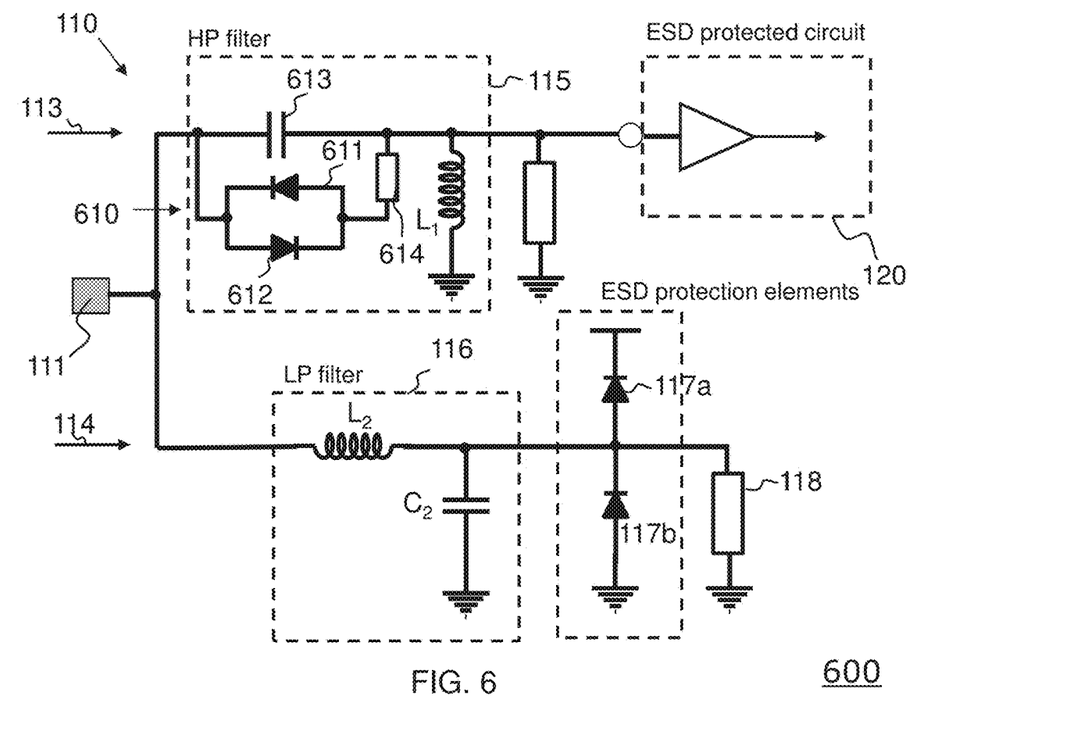
FIG. 6 is a block diagram of an electronic system comprising an ESD protection circuit with a high pass filter comprising a parallel arrangement of two diodes as capacitor of a high pass filter.

FIG. 6 is a block diagram of an electronic system 600 comprising another more detailed embodiment of the system 100 of FIG. 1. More particularly, the high pass filter 115 is implemented as LC-filter comprising an inductor $L_1$ and a parallel arrangement 610 of a diode 611 and a diode 612. The diodes 611, 612 are arranged in parallel and with opposite polarity. Furthermore, the capacity of the diodes 611, 612 are designed to be substantially equal. This may also provide a lower voltage at the signal pad 111 and over the diode capacitances. In addition, the high pass filter 115 according to this embodiment comprises a capacitor 613 in parallel to the diodes 611, 612 and a resistor 614 in series to the parallel diodes 611, 612.

Figure 7:
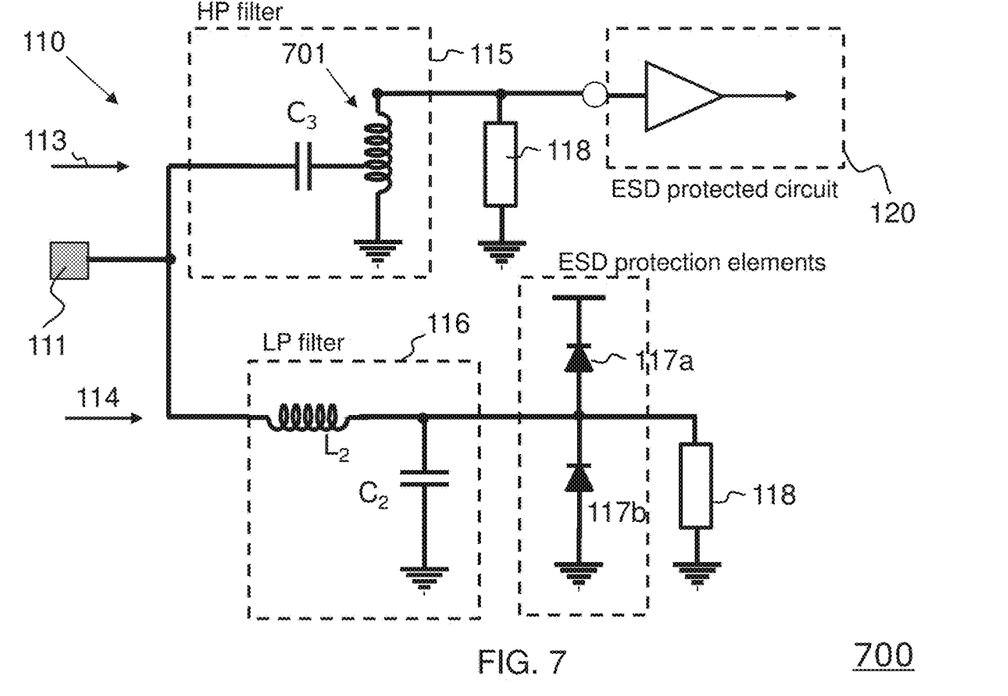
FIG. 7 is a block diagram of an electronic system comprising an ESD protection circuit with a transformer as part of the high pass filter.

FIG. 7 is a block diagram of an electronic system 700 comprising another more detailed embodiment of the system 100 of FIG. 1. More particularly, the high pass filter 115 is implemented as transformer 701. The transformer 701 is capacitive coupled via a capacitor $C_3$ to the signal pad 111. This results in a higher signal voltage of the wanted data signal and a peaking of the transformer.

Figure 8:
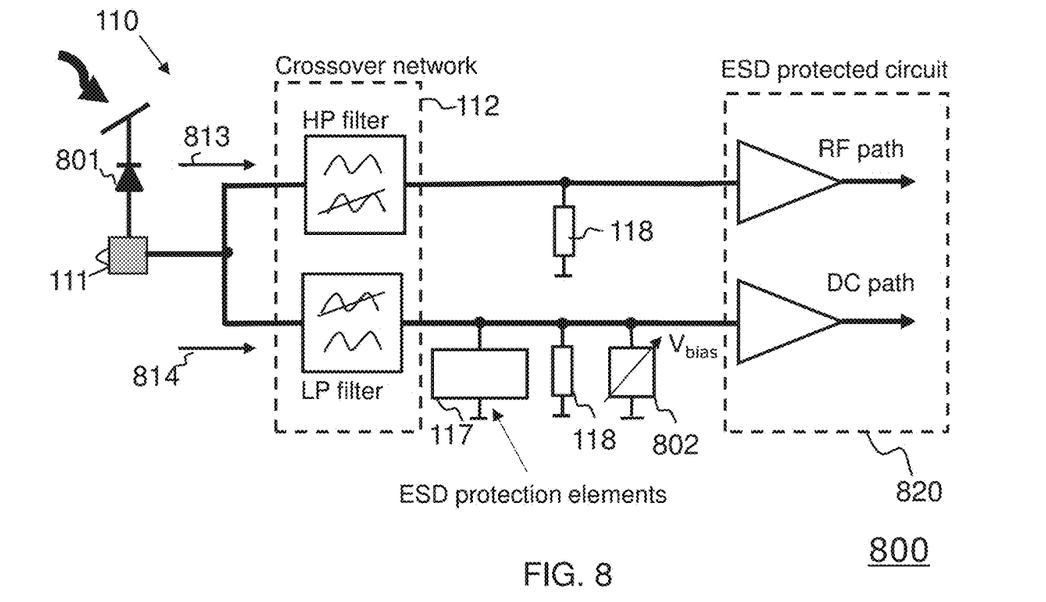
FIG. 8 is a block diagram of an optical receiver comprising an ESD protection circuit according to an embodiment.

FIG. 8 is a block diagram of an electronic system 800 comprising another more detailed embodiment of the system 100 of FIG. 1. More particularly, the system 800 is embodied as an optical receiver. The system 800 comprises a photo-diode 801 which receives an optical signal and converts it to an electrical data signal. The photo-diode 801 is coupled to the signal pad 111. A second branch 814 is configured to provide a bias voltage for the photo diode 801. For this a bias block 802 is provided in the second branch 814. The bias block 802 may be e.g. a resistor or a current source. Furthermore, the second branch 814 is coupled to an ESD protected circuit 820 which may be embodied as optical receiver chip. Hence the second branch 814 can deliver the DC level of the wanted signal to the ESD protected optical receiver chip 820.

Figure 9:
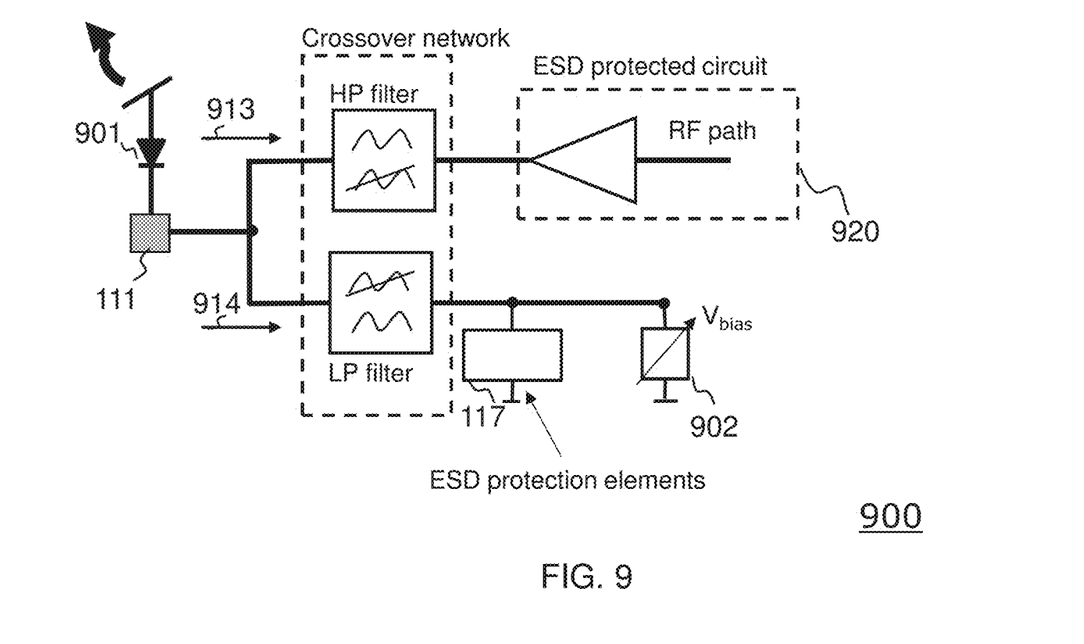
FIG. 9 is a block diagram of an optical transmitter comprising an ESD protection circuit according to an embodiment.

FIG. 9 is a block diagram of an electronic system 900 comprising another more detailed embodiment of the system 100 of FIG. 1. More particularly, the system 900 is embodied as an optical transmitter. The system 900 comprises a laser device 901 which is configured to convert electrical signals received via the signal pad 111 from an ESD protected device 920 into an optical signal and transmit this optical signal. The laser device 901 may be in particular embodied as a vertical cavity surface emitting laser (VCSEL). The system 900 comprises a first branch 913 and a second branch 914, the latter comprising a bias block 902. The bias block 902 may be e.g. a resistor or a current source. The bias block 902 is configured to provide a bias voltage for the laser device 901.

Figure 10:
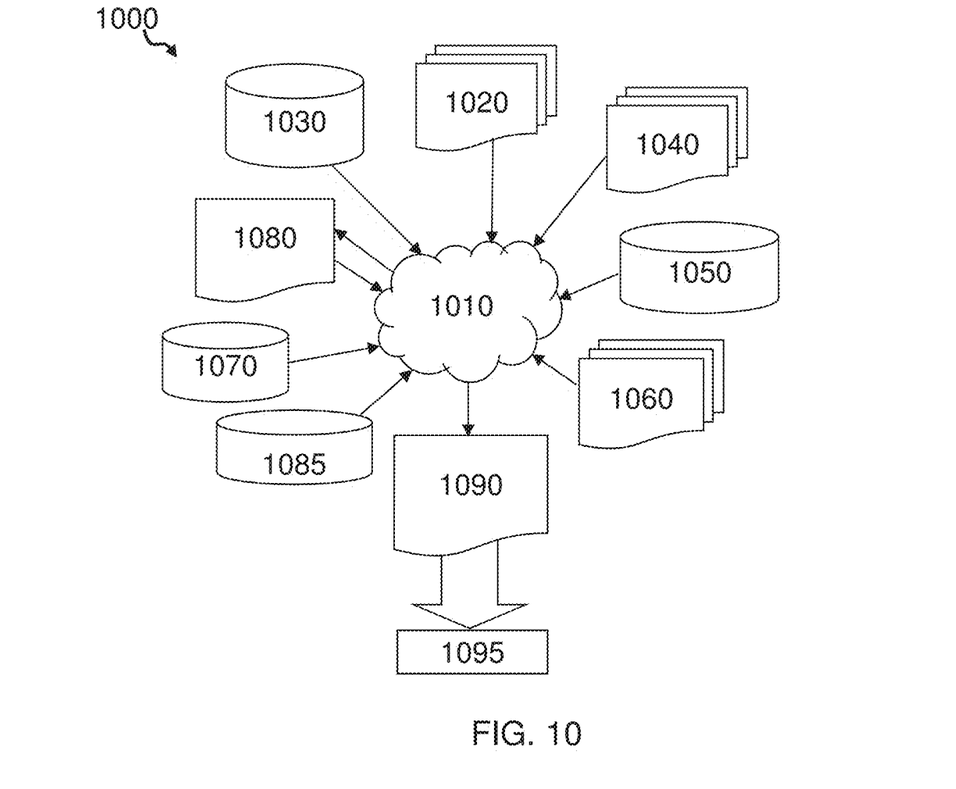
FIG. 10 is a block diagram of an exemplary design flow.

FIG. 10 shows a block diagram of an exemplary design flow 1000 used for example, in semiconductor IC logic design, simulation, test, layout, and manufacture. Design flow 1000 includes processes, machines and/or mechanisms for processing design structures or devices to generate logically or otherwise functionally equivalent representations of the design structures and/or devices described above and shown e.g. in FIGS. 1, 2 and 4-9. The design structures processed and/or generated by design flow 1000 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1000 may vary depending on the type of representation being designed. For example, a design flow 1000 for building an application specific IC (ASIC) may differ from a design flow 1000 for designing a standard component or from a design flow 1000 for instantiating the design into a programmable array, for example a programmable gate array (PGA) or a field programmable gate array (FPGA) offered by Altera® Inc. or Xilinx® Inc.

FIG. 10 illustrates multiple such design structures including an input design structure 1020 that is preferably processed by a design process 1010. Design structure 1020 may be a logical simulation design structure generated and processed by design process 1010 to produce a logically equivalent functional representation of a hardware device. Design structure 1020 may also or alternatively comprise data and/or program instructions that when processed by design process 1010, generate a functional representation of the physical structure of a hardware device. Whether representing functional and/or structural design features, design structure 1020 may be generated using electronic computer-aided design (ECAD) such as implemented by a core developer/designer. When encoded on a machine-readable data transmission, gate array, or storage medium, design structure 1020 may be accessed and processed by one or more hardware and/or software modules within design process 1010 to simulate or otherwise functionally represent an electronic component, circuit, electronic or logic module, apparatus, device, or system such as those shown in FIGS. 1, 2 and 4-9. As such, design structure 1020 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1010 preferably employs and incorporates hardware and/or software modules for synthesizing, translating, or otherwise processing a design/simulation functional equivalent of the components, circuits, devices, or logic structures shown in FIGS. 1, 2 and 4-9 to generate a Netlist 1080 which may contain design structures such as design structure 1020. Netlist 1080 may comprise, for example, compiled or otherwise processed data structures representing a list of wires, discrete components, logic gates, control circuits, I/O devices, models, etc. that describes the connections to other elements and circuits in an integrated circuit design. Netlist 1080 may be synthesized using an iterative process in which netlist 1080 is resynthesized one or more times depending on design specifications and parameters for the device. As with other design structure types described herein, netlist 1080 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 1010 may include hardware and software modules for processing a variety of input data structure types including Netlist 1080. Such data structure types may reside, for example, within library elements 1030 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1040, characterization data 1050, verification data 1060, design rules 1070, and test data files 1085 which may include input test patterns, output test results, and other testing information. Design process 1010 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1010 without deviating from the scope and spirit of the invention. Design process 1010 may also include modules for performing standard circuit design processes such as timing analysis, verification, design rule checking, place and route operations, etc.

Design process 1010 employs and incorporates logic and physical design tools such as HDL compilers and simulation model build tools to process design structure 1020 together with some or all of the depicted supporting data structures along with any additional mechanical design or data (if applicable), to generate a second design structure 1090. Design structure 1090 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 1020, design structure 1090 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1, 2 and 4-9. In one embodiment, design structure 1090 may comprise a compiled, executable HDL simulation model that functionally simulates the devices shown in FIGS. 1, 2 and 4-9

Design structure 1090 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1, 2 and 4-9. Design structure 1090 may then proceed to a stage 1095 where, for example, design structure 1090: proceeds to tape-out, is released to manufacturing, is released to a mask house, is sent to another design house, is sent back to the customer, etc.

Figure 11:
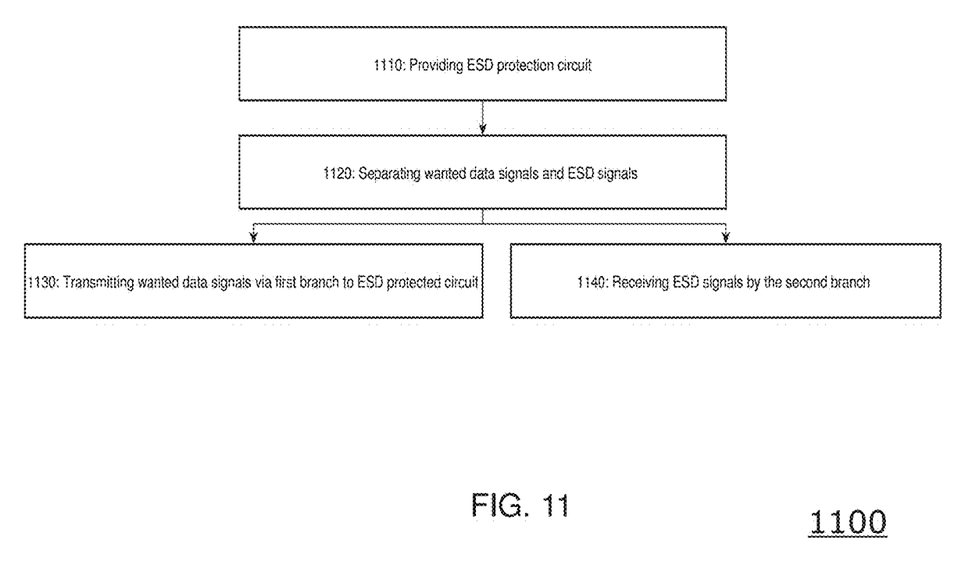
FIG. 11 shows a flow chart of method steps of a method according to an embodiment.

FIG. 11 shows a flow chart of method steps of a method for providing electrostatic discharge (ESD) protection to an ESD protected circuit.

At a step 1110, an ESD protection circuit is provided, e.g. the ESD protection circuit 110 as described with reference to FIG. 1. Accordingly the ESD protection circuit 110 comprises the signal pad 111, the crossover network 112, the first branch 113 and the second branch 114.

At a step 1120, the crossover network 112 separates the wanted electrical data signals and the ESD signals according to their frequency.

At a step 1130, the first branch 113 transmits the wanted electrical data signals between the signal pad 111 and the ESD protected circuit 120.

At a step 1140, the second branch 114 receives the ESD signals from the signal pad 111.

Figure 12:
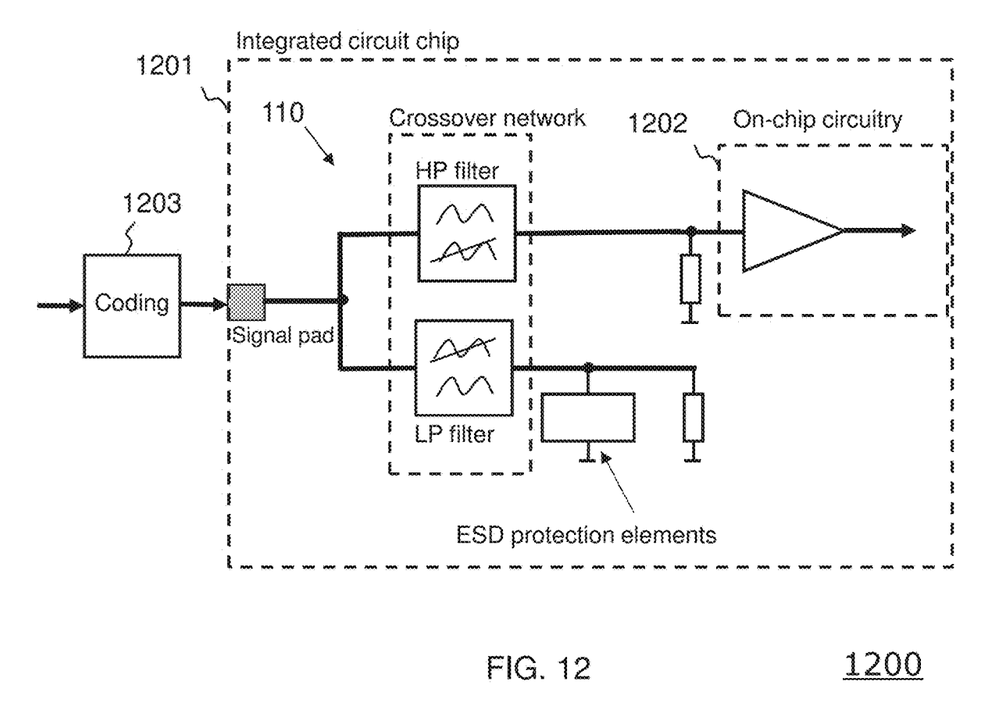
FIG. 12 shows a system comprising coding circuitry and an integrated circuit chip comprising an ESD protection circuit.

FIG. 12 shows a system 1200 comprising an integrated circuit chip 1201 with an electrostatic discharge (ESD) protection circuit 110 for providing ESD protection to on-chip circuitry 1202 of the chip 1201. The system 1200 further comprises coding circuitry 1203. The coding circuitry 1203 is configured to provide coding for a wanted signal to be processed by the integrated circuit chip 1201 such that the frequency spectrum of the wanted signal is above the frequency spectrum of the ESD signals. The coding circuitry may be implemented e.g. by channel coding circuitry as known in the art that adapts the spectrum of the wanted signal as desired. The coding circuitry 1203 could e.g. be implemented in I/O links.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. An integrated circuit chip comprising an electrostatic discharge (ESD) protection circuit for providing ESD protection to on-chip circuitry of the chip, the integrated circuit chip comprising:
   a bond pad;
   a crossover network directly coupled to the bond pad for separating wanted electrical data signals and ESD signals according to their frequency into at least a first branch and a second branch, wherein the first branch comprises a high pass filter, the high pass filter being configured to transmit only frequency components above a predefined spectrum of the ESD signals; and the second branch comprises a low pass filter, the low pass filter being configured to transmit frequency components within the predefined spectrum of the ESD signals, wherein the high pass filter is implemented as a transformer, the transformer being capacitive coupled to the bond pad via a capacitor;
   wherein the first branch is configured to transmit at least a spectral part of the wanted electrical data signals between the bond pad and the on-chip-circuitry; and
   the second branch is configured to receive the ESD signals from the bond pad, the crossover network configured to transmit frequency components below approximately 2 GHz to the second branch and frequency components above approximately 4 GHz to the first branch.

2. The integrated circuit chip comprising the ESD protection circuit according to claim 1, the ESD protection circuit being configured such that the energy of the ESD signals is absorbed in the second branch.

3. The integrated circuit chip comprising the ESD protection circuit according to claim 1, wherein the crossover network is a frequency diplexer.

4. The integrated circuit chip comprising the ESD protection circuit according to claim 1, wherein the predefined spectrum of the ESD signals comprise the frequency range of standardized ESD-events.

5. The integrated circuit chip comprising the ESD protection circuit according to claim 1, wherein the predefined spectrum of the ESD signals comprise the frequency range of the ESD charge device model (CDM).

6. The integrated circuit chip comprising the ESD protection circuit according to claim 1, wherein
   the second branch comprises one or more ESD-protection elements.

7. The integrated circuit chip comprising the ESD protection circuit according to claim 6, wherein the one or more ESD protection elements are implemented as diodes.

8. The integrated circuit chip comprising the ESD protection circuit according to claim 1, wherein
   the first branch is configured to transmit a high frequency part of the spectrum of the wanted signals to the ESD protected circuit;

the second branch is configured to transmit and to recover a low frequency part of the spectrum of the wanted signals to the ESD protected circuit.

9. The integrated circuit chip comprising the ESD protection circuit according to claim 1, wherein the second branch is configured to recover the DC level of the wanted signals.

10. The integrated circuit chip comprising the ESD protection circuit according to claim 1, wherein the first branch and the second branch comprise a line impedance termination.

11. The integrated circuit chip comprising the ESD protection circuit according to claim 1, wherein the
high pass filter is configured as second order high pass filter; and
the low pass filter is configured as second order low pass filter.

12. The integrated circuit chip comprising the ESD protection circuit according to claim 1, wherein the
high pass filter is configured as third order high pass filter; and
the low pass filter is configured as second order low pass filter.

13. The integrated circuit chip comprising the ESD protection circuit according to claim 1, wherein the low pass filter is implemented as second order LC-filter comprising an inductor and a capacitor, wherein the inductor is arranged closer to the bond pad than the capacitor.

14. The integrated circuit chip comprising the ESD protection circuit according to claim 1, wherein the high pass filter is implemented as second order LC-filter comprising an inductor and a capacitor, wherein the capacitor is arranged closer to the bond pad than the inductor.

15. The integrated circuit chip comprising the ESD protection circuit according to claim 1, wherein the high pass filter is implemented as filter comprising an inductor and a parallel arrangement of two diodes, wherein the diodes are arranged with opposite polarity and wherein the diodes are configured to provide a substantially equal capacitance.

16. An optical receiver comprising:
an integrated circuit chip comprising an electrostatic discharge (ESD) protection circuit for providing ESD protection to an ESD protected circuit, the ESD protection circuit comprising:
a bond pad;
a crossover network directly coupled to the bond pad for separating wanted electrical data signals and ESD signals according to their frequency into at least a first branch and a second branch, wherein the first branch comprises a high pass filter, the high pass filter being configured to transmit only frequency components above a predefined spectrum of the ESD signals; and the second branch comprises a low pass filter, the low pass filter being configured to transmit frequency components within the predefined spectrum of the ESD signals, wherein the high pass filter is implemented as a transformer, the transformer being capacitive coupled to the bond pad via a capacitor; wherein
the first branch is configured to transmit at least a spectral part of the wanted electrical data signals having frequency components above approximately 4 GHz between the bond pad and the ESD protected circuit; and
the second branch is configured to receive the ESD signals having frequency components below approximately 2 GHz from the bond pad; and a photo-diode, wherein the photo-diode is directly coupled to the bond pad;
the second branch is configured to provide a bias voltage for the photo diode; and
the second branch is configured to deliver the DC level of the wanted signals to the receiver.

17. An optical transmitter comprising:
an integrated circuit chip comprising an electrostatic discharge (ESD) protection circuit for providing ESD protection to an ESD protected circuit, the ESD protection circuit comprising:
a bond pad;
a crossover network directly coupled to the bond pad for separating wanted electrical data signals and ESD signals according to their frequency into at least a first branch and a second branch, wherein the first branch comprises a high pass filter, the high pass filter being configured to transmit only frequency components above a predefined spectrum of the ESD signals; and the second branch comprises a low pass filter, the low pass filter being configured to transmit frequency components within the predefined spectrum of the ESD signals, wherein the high pass filter is implemented as a transformer, the transformer being capacitive coupled to the bond pad via a capacitor; wherein
the first branch is configured to transmit at least a spectral part of the wanted electrical data signals having frequency components above approximately 4 GHz between the bond pad and the ESD protected circuit; and
the second branch is configured to receive the ESD signals having frequency components below approximately 2 GHz from the bond pad;
and a laser device, wherein the laser device is directly coupled to the bond pad;
the second branch is configured to provide a bias voltage for the laser device.

18. The optical transmitter according to claim 17, wherein the laser device is a vertical cavity surface emitting laser.

19. A system comprising: an integrated circuit chip comprising an electrostatic discharge (ESD) protection circuit for providing ESD protection to on-chip circuitry of the chip, the integrated circuit chip comprising:
a bond pad;
a crossover network directly coupled to the bond pad for separating wanted electrical data signals and ESD signals according to their frequency into at least a first branch and a second branch, wherein the first branch comprises a high pass filter, the high pass filter being configured to transmit only frequency components above a predefined spectrum of the ESD signals; and the second branch comprises a low pass filter, the low pass filter being configured to transmit frequency components within the predefined spectrum of the ESD signals, wherein the high pass filter is implemented as a transformer, the transformer being capacitive coupled to the bond pad via a capacitor; wherein
the first branch is configured to transmit at least a spectral part of the wanted electrical data signals between the bond pad and the on-chip-circuitry; and
the second branch is configured to receive the ESD signals from the bond pad; and coding circuitry directly coupled to the bond pad, the coding circuitry being configured to provide coding for a wanted signal to be processed by the integrated circuit chip such that the frequency spectrum of the wanted signals is above the frequency spectrum of the ESD signals, and wherein the crossover network is configured to transmit frequency components below approximately 2 GHz to the second branch and frequency components above approximately 4 GHz to the first branch.

* * * * *